United States Patent
Courtney et al.

(10) Patent No.: US 6,665,518 B1
(45) Date of Patent: Dec. 16, 2003

(54) ASYMMETRIC ASSIGNMENT OF SPACE-BORNE COMMUNICATION SYSTEM RESOURCES

(75) Inventors: William F. Courtney, Long Beach, CA (US); Richard L. Vogel, Palos Verdes Estates, CA (US); Raymond M. Nuber, Rancho Palos Verdes, CA (US)

(73) Assignee: Northrop Gumman Corporation, Redondo Beach, CA (US)

( * ) Notice: Subject to any disclaimer, the term of this patent is extended or adjusted under 35 U.S.C. 154(b) by 0 days.

(21) Appl. No.: 09/516,105

(22) Filed: Mar. 1, 2000

(51) Int. Cl.[7] .............................................. H04B 7/185
(52) U.S. Cl. ........................ 455/12.1; 455/427; 455/450
(58) Field of Search ................................ 455/12.1, 13.1, 455/450, 452.1, 453, 427, 428, 452.2; 342/350, 352

(56) References Cited

U.S. PATENT DOCUMENTS 4,425,639 A * 1/1984 Acampora et al. .......... 455/13.3
6,101,385 A * 8/2000 Monte et al. ................ 455/427
6,175,719 B1 * 1/2001 Sarraf et al. ................ 455/13.1

* cited by examiner

Primary Examiner—Quochien Vuong
(74) Attorney, Agent, or Firm—McAndrews, Held & Malloy, Ltd.

(57) ABSTRACT

The present method (300) for allocating bandwidth in a satellite communication system (500) includes determining (304) an uplink assignment of uplinks (512) to user terminals (506) and a gateway (504). The uplink assignment is preferably based on input parameters including a gateway uplink efficiency, a user terminal uplink efficiency, and a traffic ratio between the user terminal and the gateway. The method (300) also determines a downlink assignment of downlinks (516) to the user terminals (506) and one or more gateways (504). The downlink assignment is preferably based on traffic offered to the user terminals (506) and the gateways (504) as dictated by the uplink assignment. Either of the uplink assignment and downlink assignment may be integer or non-integer assignments.

37 Claims, 7 Drawing Sheets

ASYMMETRIC ASSIGNMENT OF SPACE-BORNE COMMUNICATION SYSTEM RESOURCES

BACKGROUND OF THE INVENTION

The present invention relates to assignment of bandwidth resources in a communication system. In particular, the present invention relates to asymmetric assignment of communication bandwidth in a satellite communications system.

Communication networks transmit and receive staggering amounts of information that may have virtually any origin including, for example, the Internet, the public telephone system, and television stations. In modern communication systems, a considerable portion of the information may be multiplexed into data streams and transmitted over satellite uplinks and downlinks before reaching its destination. Thus, for example, Internet service providers (ISPs) could transmit information through a satellite to numerous individual receivers.

In order to accommodate the tremendous demand for communication bandwidth, modern communication satellites provide uplink and downlink capacities of many gigabits per second. Of course, modern communication satellites are extremely expensive to design, launch, and operate. Thus, a new communication satellite cannot simply be launched whenever convenient to increase bandwidth in a communication system. Rather, the bandwidth provided by existing communication satellites must be assigned so that it is most efficiently used while generating the most revenue.

In the past, however, communication system controllers assigned equal uplink and downlink bandwidth to individual terminals or groups of terminals. While providing a simple solution to bandwidth allocation, equal assignment of uplink and downlink bandwidth ignored the fact that in many situations, uplink and downlink bandwidth needs are dramatically different. For example, in the ISP setting, a home computer terminal typically receives between 5 and 20 times more information than it transmits.

In such situations, an equal assignment of uplink and downlink bandwidth to the terminal results in a significant waste of uplink bandwidth. In turn, wasted bandwidth significantly decreases the communication system revenues, efficiency, and throughput. Furthermore, some communication system controllers already purposefully overprovide bandwidth to terminals to reduce latency. Thus, any additional bandwidth assigned, but not used by terminals, has a further negative impact on system revenue, throughput, and efficiency.

A need has long existed in the industry for an improved method and apparatus for assignment of communication bandwidth in a space-borne communications system.

BRIEF SUMMARY OF THE INVENTION

One aspect of the present invention is asymmetric assignment of bandwidth in a communication system.

Another aspect of the present invention is asymmetric assignment of uplink and downlink bandwidth in a satellite communication system.

One feature of the present invention is Assignment of bandwidth in a communication system that considers uplink and downlink utilization efficiencies, outbound to inbound traffic ratio, and other input parameters.

Yet another feature of the present invention is the assignment of uplink and downlink bandwidth in a satellite communication system that accounts for concentrators onboard a satellite.

The present method for allocating bandwidth in a satellite communication system includes the step of determining an assignment of uplinks to user terminals and one or more gateways. The uplink assignment is preferably based on a gateway uplink efficiency, a user terminal uplink efficiency, and a traffic ratio between the user terminal and the gateways. The method also determines an assignment of downlinks to the user terminals and the gateways. The downlink assignment is preferably based on traffic offered to the user terminals and the gateways as dictated by the uplink assignment.

Either of the uplink assignment and downlink assignments may be integer or non-integer assignments. Integer and non-integer assignments may be used when the uplinks and/or downlinks are divisible into assignable subchannels. Integer assignments may be used when the uplinks are indivisible. In some instances, the assignment that maximizes outbound capacity is a non-integer assignment. In cases where the uplinks and downlinks are indivisible, the present method may then evaluate integer assignments of uplinks around the non-integer assignment to determine an integer assignment that most closely matches the maximal outbound capacity.

The present method, in determining the downlink assignments, preferably considers the relative size (i.e., capacity) of uplinks compared to downlinks. The method may further determine the desired number of downlinks needed for a gateway and the user terminals to meet the bandwidth demands resulting from the uplink assignments. When the number of available downlinks is sufficient, the method assigns the desired number of downlinks. Otherwise, the method preferably evaluates assignments of downlinks to the user terminals and gateways to find a capacity maximizing downlink assignment given the total number of available downlinks.

The present satellite communication system bandwidth controller includes uplink and downlink assignment circuitry and communication circuitry. The assignment circuitry is operable to determine an assignment of uplinks to user terminals and gateways, based on a gateway uplink efficiency, a user terminal uplink efficiency, and a traffic ratio between the user terminal and the gateway among other information. The assignment circuitry is also operable to determine an assignment of downlinks to the user terminals and the gateways, based on traffic offered to the user terminals and the gateways according to the uplink assignment.

The bandwidth controller may further include input parameter determination circuitry for determining the gateway uplink efficiency, user terminal uplink efficiency, and the traffic ratio, by receiving the parameters as design inputs or by evaluating a communication system monitor input. The bandwidth controller may be disposed onboard a satellite, or on the ground at a location nearby or remote from the gateways or user terminals. In one embodiment, the bandwidth controller evaluates a communication system in operation and responsively dynamically adjusts the uplink and downlink assignments. In another embodiment, the bandwidth controller evaluates uplink and downlink assignments in advance for a planned communication system. As noted above, the uplink and downlink assignments may be integer or non-integer, and may further take into consideration the presence or absence of a multiplexer or concentrator onboard a satellite.

DETAILED DESCRIPTION OF THE INVENTION

Figure 1:
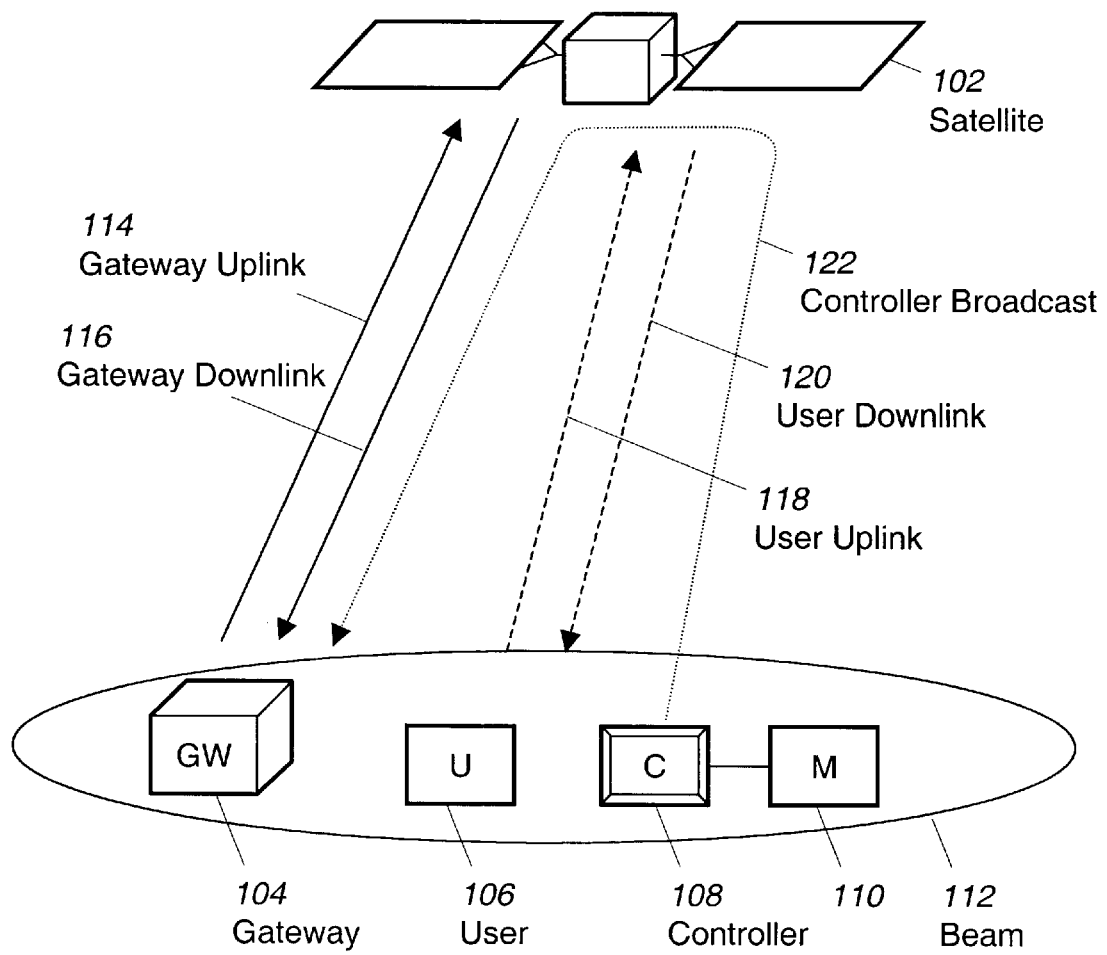
FIG. 1 introduces the entities involved in a satellite communication system.

Turning now to FIG. 1, that figure illustrates the entities involved in a satellite communication system 100. The communication system 100 includes a satellite 102, gateway terminals 104, and user terminals 106. Also shown are a controller 108 and a monitor 110. The satellite 102 generates a spot beam 112 which supports uplinks and downlinks. For example, FIG. 1 shows a gateway terminal uplink 114, a gateway terminal downlink 116, a user terminal uplink 118, and a user terminal downlink 120. A signaling channel 122 is also present in FIG. 1.

In a preferred implementation, one of the terminals involved in communicating through the satellite 102 is a high throughput terminal called a gateway (e.g., the gateway 104). The user terminals are generally smaller individual terminals, for example home computers or cellular phones. The user terminals may, for example, represent web browsing individuals and the gateways Internet Service Providers (ISPs). The user terminals typically send far less traffic to the gateways than the gateways send to the users. Ratios ranging between 5-to-1 and 20-to-1 are not unusual.

The satellite 102 may be any type of communication satellite. For example, the satellite 102 may be a bent-pipe satellite, an analog multiplexer satellite, an analog switch satellite, a digital processing satellite, or a hybrid type. The uplinks 114, 118 and downlinks 116, 120 may be of any modulation type and may have any physical make-up and link layer protocols. Thus, for example, the uplinks may be formed using Frequency Division Multiplexing or Multiple Access (FDM/FDMA), Time Division Multiplexing or Multiple Access (TDM/TDMA), Code Division Multiple Access (CDMA) techniques, or combinations of such access techniques. The bandwidth providing individual frequency channels, time slots, or codes (collectively "subchannels") may be individually assigned, down to any available level of granularity, as described below, or entire uplinks and downlinks may be assigned as unitary entities constructed from numerous subchannels.

The bandwidth assignment technique discussed below may further take into consideration features available onboard the satellite in order to maximize the effective capacity of the communication system. For example, when the satellite has a concentrating function such as a statistical multiplexer or concentrator (which removes some or all of the unused bandwidth in the uplinks before putting traffic in the downlinks), the invention may consider the presence of the concentrator in its determination of bandwidth assignments. An example of bandwidth assignments taking into consideration the presence of a concentrator is set forth below.

Figure 2A:
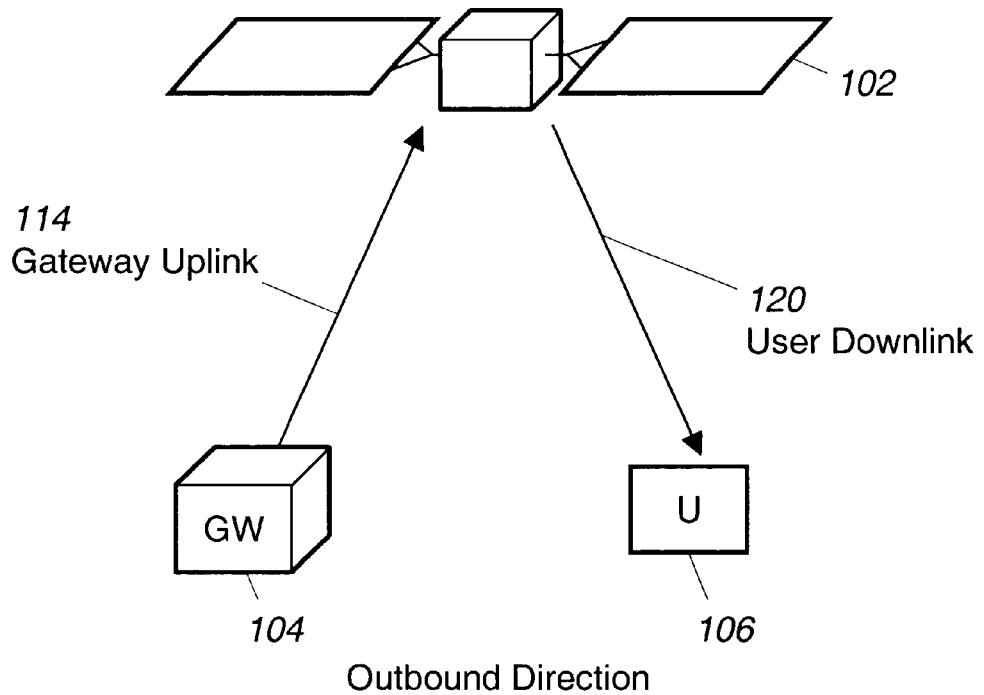
FIG. 2 illustrates the inbound and outbound direction of traffic in a satellite communication system.
Figure 2B:
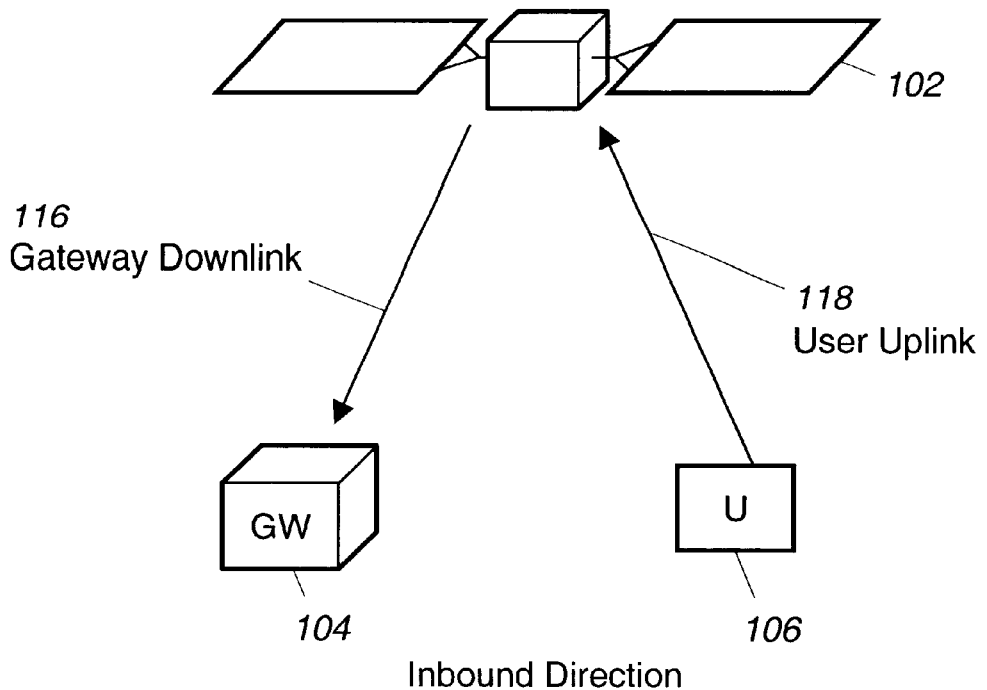

Turning now to FIGS. 2a–2b, those figures illustrate the inbound and outbound direction of traffic travelling between terminals. In particular, FIG. 2a illustrates a satellite 102 forwarding communications from a gateway 104 to a user terminal 106. The direction of traffic flow from the gateway 104 to the user terminal 106 is referred to as the "outbound" direction. Traffic flow in the outbound direction travels over the gateway uplink 114 (i.e., the outbound uplink), through the satellite 102, and over the user downlink 120 (i.e., the outbound downlink) to the user terminal 106. Similarly, FIG. 2b shows that traffic flow in the "inbound" direction travels over the user uplink 118 (i.e., the inbound uplink), through the satellite 102, and over the gateway downlink 116 (i.e., the inbound downlink) to the gateway 104.

Referring again to FIG. 1, the controller 108 preferably makes and modifies bandwidth assignments, and may also be used in an initial planning role when developing a new communication system. Principal functions of the controller 108 include assigning satellite uplink and downlink bandwidth to the user terminals 106 and the gateways 104 and communicating these assignments to the user terminals 106 and the gateways 104. The assignments may be communicated in any number of ways including through terrestrial communication networks. In the preferred embodiment, however, the controller communicates assignments over a signaling channel 122 carried through the satellite 102 to the user terminals 106 and the gateways 104. The signaling channel 122 typically uses a very small amount of bandwidth and may be carried, for example, by any available uplink or downlink.

The monitor 110 periodically evaluates the amount of bandwidth granted to and used by the user terminals 106 and the gateways 104 by using an antenna and processing circuitry or other monitoring hardware/software to evaluate traffic flow. The monitor 110 itself is optional. When the monitor 110 is not present, the controller 108 may operate using approximations or predetermined values. In addition, the monitor 110 may, in some instances, form a part of the controller 108 itself, although the monitor 110 may also be implemented as a remotely operating independent device (with appropriate communication connection to the controller 108).

Note that the controller 108 may make bandwidth assignments (discussed below) at a very fine or a very coarse level of refinement or granularity, depending upon the needs and capabilities of the communication system and the detail of information available. In other words, a communication system may only include the capability to assign bandwidth on the basis of entire uplinks or downlinks. On the other hand, a more sophisticated communication system may include the capability to assign bandwidth in terms of individual channels or subchannels (e.g., codes or time slots) in the uplinks and downlinks. The bandwidth assignments described below make the most efficient use of the available bandwidth in light of the granularity constraint imposed by the communication system.

Table 1 presents the quantities that the controller 108 preferably considers in assigning uplinks and downlinks in its preferred implementation:

TABLE 1

| Parameter | Description |
|---|---|
| R | The ratio of outbound to inbound traffic. |
| $UE_{gwul}$ | The utilization efficiency of the gateway uplinks. |
| $UE_{uul}$ | The utilization efficiency of the user uplinks. |
| $UE_{gwdl}$ | The utilization efficiency of the gateway downlinks. |
| $UE_{uudl}$ | The utilization efficiency of the user downlinks. |
| RelSize | The ratio of the relative raw capacity of an uplink to the raw capacity of a downlink. |
| $Num_{up}$ | The number of available uplinks. |
| $Num_{down}$ | The number of available downlinks. |

The parameters in Table 1 may originate, for example, from an engineering or marketing study for a new communication system. The ratio R is the presumed "native" asymmetry in the way a communication system operates. For example, as indicated above in the context of ISPs and web surfers, R may range from 5:1 (R=5) to 20:1 (R=20).

The utilization efficiencies, UE, provide estimates of the amount of traffic that may actually be sent in a unit amount of provisioned bandwidth. For example, a user uplink may operate with a $UE_{uul}$ of 20% or less due to contentious multiple access techniques (e.g., slotted ALOHA) used on the uplinks. With such techniques, high utilization leads to an unacceptable level of interference (and thus latency) between competing transmitters. In a similar fashion, operating a downlink near 100% of its capacity creates long queues on the satellite because aggregate traffic from numerous sources can exceed the downlink capacity. It is then possible for the queue to grow beyond available memory, resulting in data loss.

As an example, a terminal with a 50% utilization efficiency that is expected, on average, to transmit 100 kbps requires 200 kbps of bandwidth. In this example, 100 kbps of bandwidth is, on average, in use, while the other 100 kbps of bandwidth provides extra capacity to immediately handle bursty traffic. Latency is thereby reduced by overproviding bandwidth. In some instances, as will be seen below, the terminal or gateway is assigned exactly the bandwidth it needs on average (i.e. there is no extra bandwidth capacity on average).

Continuing the description of the parameters shown in Table 1, the term RelSize gives the relative capacity of an uplink and a downlink without regard to the utilization efficiencies or loading of the links. In other words, a RelSize of 2 indicates that an uplink is able to carry twice as much traffic as a downlink. The terms $Num_{up}$ and $NUM_{down}$ give the number of uplinks and downlinks available for assignment. In one implementation, as noted above, the uplinks and downlinks are assigned in their entireties to the terminals. In more sophisticated implementations, the subchannels within the uplinks and downlinks may be individually assigned according to the discussion and equations set forth below. Thus, for example, assigning 3.3 uplinks to user terminals may, in fact, indicate that 3 entire uplinks, and 3 of 10 subchannels of a fourth uplink are assigned to user terminals.

Figure 3:
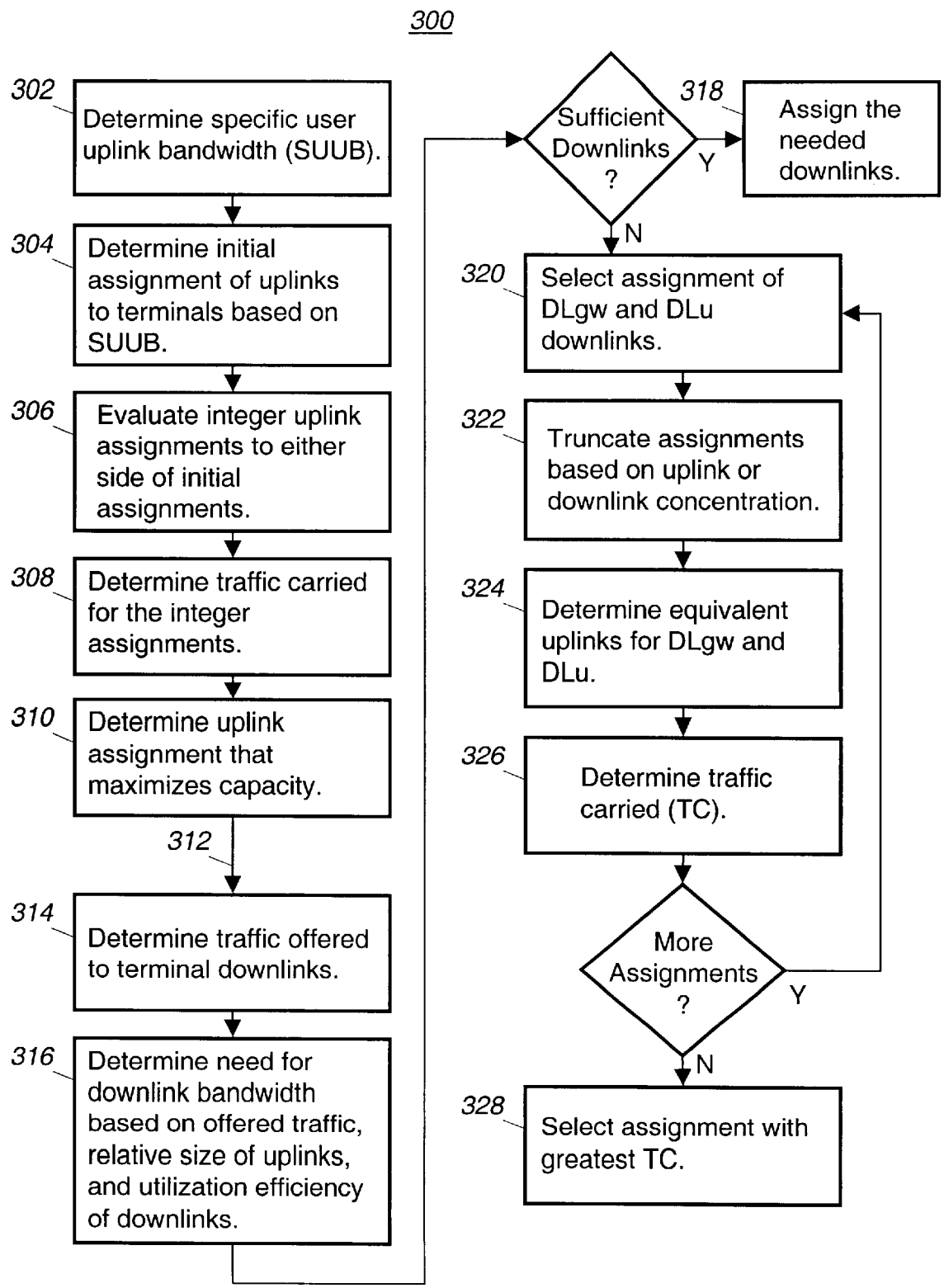
FIG. 3 shows a flow diagram of an asymmetric bandwidth assignment process executed by a controller.

Turning now to FIG. 3, that figure presents a flow diagram 300 showing the processing that occurs in a preferred implementation of the controller 108. At step 302, the controller 108 determines a user uplink bandwidth metric. In particular, the controller 108 determines SUUB, the specific user uplink bandwidth. The SUUB parameter combines the two uplink utilization efficiencies and the outbound-to-inbound traffic ratio to indicate to the controller 108 how much user uplink bandwidth to assign per unit of gateway uplink bandwidth:

$$SUUB=(UE_{gwul}/UE_{uul})/R \quad [1]$$

Next, at step 304, the controller tentatively divides the available uplinks between the gateway and the user terminals according to equations [2] and [3]:

$$TentAssign_{gwul} = Num_{up}/(1 + SUUB) \quad [2]$$

$$TentAssign_{uul} = Num_{up} * SUUB/(1 + SUUB) \quad [3]$$
$$= Num_{up} - TentAssign_{gwul}$$

$TentAssign_{gwul}$ is the tentative gateway uplink assignment and $TentAssign_{uul}$ is the tentative user uplink assignment. Note that equations [2] and [3] assign, in total, all the available uplinks either to the gateway or to the users, but that the assignments will not necessarily be whole numbers of uplinks. Such non-integer assignments are allowed if the uplinks may be shared between the users and gateways. Otherwise, the controller 108 adjusts the tentative assignments to whole numbers of uplinks.

The tentative assignment of uplinks is an optimal allocation of uplinks in the sense that it maximizes the total traffic that the uplinks carry subject to the ratio R and the utilization efficiencies. Alternative assignments will carry less traffic. The further an alternate assignment varies from the tentative assignment, the less traffic that assignment carries.

Figure 4:
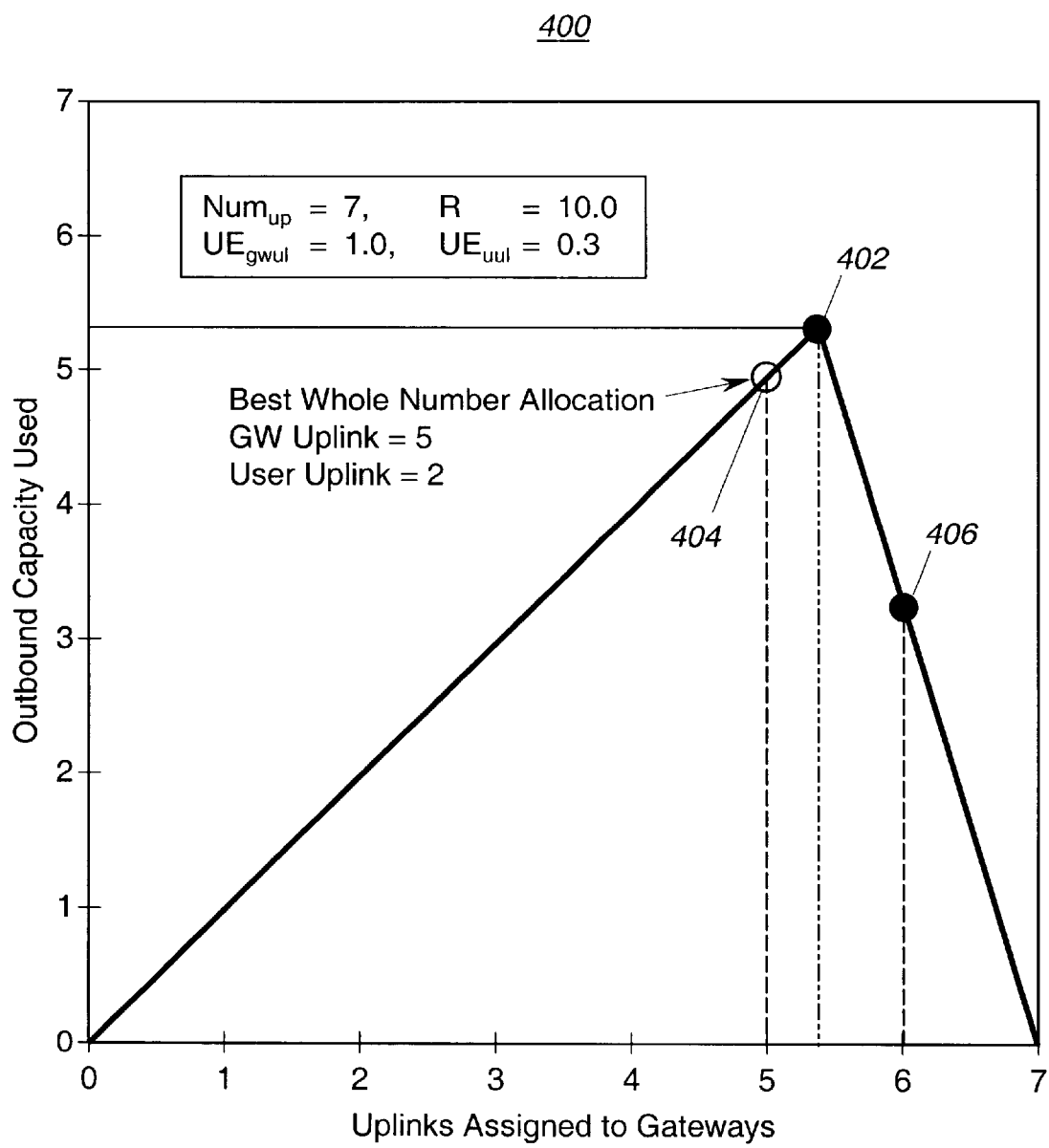
FIG. 4 depicts the nearest integer assignments of uplinks around a non-integer uplink assignment that provides maximum outbound capacity.

Turning briefly to FIG. 4, that figure illustrates a graph 400 of assignments of uplinks to a gateway, and the resulting outbound capacity used in the outbound direction. The graph 400 reflects the fact that user terminal inbound traffic generates the responsive outbound traffic from the gateway. Therefore, when the user terminals have less than a certain amount of uplink bandwidth for inbound transmissions, the gateway outbound traffic according falls. FIG. 4 shows a scenario in which $Num_{up}$=7, R=10, $UE_{gwul}$=1.0, and $UE_{uul}$=0.3. According to equations [1], [2], and [3], $TentAssign_{gwul}$=5.25 and $TentAssign_{uul}$=1.75; because $UE_{gwul}$=1.0, the outbound capacity is 5.25 units of traffic. The point 402 illustrates the tentative assignment.

As noted above, in some systems, the controller 108 may only assign integer numbers of uplinks or downlinks. In such a system, the controller 108 evaluates the integer assignments around the tentative assignment (if it is not already an integer assignment). Thus, in FIG. 4, the controller 108 evaluates the outbound traffic carried by assigning 5 uplinks to the gateway and 2 uplinks to the user terminals (point 404) or 4 uplinks to the gateway and 3 uplinks to the user terminals (point 406). At point 404, the outbound capacity is 5 full units. At point 406, the outbound capacity is only 3 units (although allocated 6 full uplinks that can carry 6 full units of traffic). Because the one remaining uplink, assigned to the user terminals at $UE_{uul}$=0.3 (or 0.3 units of traffic on average) only results in R=10 times as much (3 units) outbound traffic.

Returning to FIG. 3, the controller 108 preferably evaluates, at step 306, the integer solutions on either side of the tentative assignments to find the best realizable uplink assignment. That is, the controller 108 considers the assignments:

$$AssignA_{gwul}=\text{ceiling}(TentAssign_{gwul})$$

$$AssignA_{uul}=\text{floor}(TentAssign_{uul}) \quad [4A]$$

and $$\text{AssignB}_{gwuf}=\text{floor}(\text{TentAssign}_{gwul})$$

$$\text{AssignB}_{uuf}=\text{ceiling}(\text{TentAssign}_{uul}) \quad [4B]$$

where ceiling(i) is the smallest integer greater than or equal to i and floor(j) is the greatest integer less than or equal to j.

In one implementation, the controller 108 uses the actual traffic carried in the gateway uplinks as a measure of traffic carrying capacity of an assignment of $UL_{gw}$ uplinks to the gateways and $UL_u$ uplinks to the users. This measure is accurate because the traffic carried in the user uplinks is 1/R the traffic carried in the gateway uplinks.

In the scenario shown in FIG. 4, $\text{AssignA}_{gwul}=6$ $\text{AssignA}_{uul}=1$ and $\text{AssignB}_{gwul}=5$ $\text{AssignB}_{uul}=2$ Next, at step 308, the controller determines traffic carried in the gateway uplinks according to:

$$\text{CarriedUp}(UL_{gw}, UL_u)=\text{minimum}(UL_{gw}*UE_{gwul}, R*UL_u*UE_{uul}) \quad [5]$$

The controller determines CarriedUp for each of the assignments that result from equations [4A] and [4B] and then, at step 310, makes a final uplink assignment depending on which of the two assignments gives the greater capacity:

If CarriedUp($\text{AssignA}_{gwul}$, $\text{AssignA}_{uul}$) is greater than or equal to CarriedUp ($\text{AssignB}_{gwul}$, $\text{AssignB}_{uul}$) then $\text{Assign}_{gwuf}=\text{AssignA}_{gwul}$ and $\text{Assign}_{uuf}=\text{AssignA}_{uul} \quad [6A]$ Otherwise, $\text{Assign}_{gwuf}=\text{AssignB}_{gwul}$ and $\text{Assign}_{uuf}=\text{AssignB}_{uul} \quad [6B]$ Again, in the scenario shown in FIG. 4 (which is carried through in the equations below):

CarriedUp ($\text{AssignA}_{gwul}$, $\text{AssignA}_{uul}$)=3, which is less than CarriedUp ($\text{AssignB}_{gwul}$, $\text{AssignB}_{uul}$)=5 and therefore:

$\text{Assign}_{gwuf}=\text{AssignB}_{gwuf}=5$, and $\text{Assign}_{uuf}=\text{AssignB}_{uuf}=2$.

Next, as shown by transition arrow 312, the controller 108 proceeds to assign downlinks to the gateways and users. Preferably, the controller 108 makes the assignments such that all the traffic offered to downlinks by the uplinks is carried to the ground. Such assignments may be achieved if the number of available downlinks and the utilization efficiencies of the downlinks are adequate. Otherwise, the controller 108 preferably delivers the greatest possible amount of traffic in the outbound and inbound directions. The controller 108 delivers this maximum using the approach outlined below.

First, at step 314, the controller determines the amount of traffic offered to the gateway downlinks and the user downlinks. This determination depends upon whether the satellite has a concentrating capability. In other words, the determination depends upon whether the satellite can discard unused uplink bandwidth before offering traffic to the downlinks.

The traffic offered (TO) to the user downlinks and the gateway downlinks, if the satellite concentrates traffic, is:

$\text{TO}_{udl}=\text{CarriedUp}(\text{Assign}_{gwul}, \text{Assign}_{uul})$.

$\text{TO}_{gwdl}=(1/R) \text{CarriedUp}(\text{Assign}_{gwul}, \text{Assign}_{uul})$.

In the example of FIG. 4, if the satellite concentrates traffic, then $\text{TO}_{udl}=5$ and $\text{TO}_{gwdl}=0.5$.

In other words, the traffic offered to a downlink, with concentration, is adjusted to reflect the fact that only part of the uplink carries useful data. The rest does not carry traffic and is discarded before downlinking.

The traffic offered (TO) to the user downlinks and the gateway downlinks, if the satellite does not concentrate outbound traffic, is:

$\text{TO}_{udl}=\text{Assign}_{gwul}$, and $\text{TO}_{gwdl}=\text{Assign}_{uul}$.

In the example of FIG. 4, if the satellite does not concentrate traffic, $\text{TO}_{udl}=5$ and $\text{TO}_{gwdl}=2$.

In other words, the traffic offered to a downlink, without concentration, is exactly equal to traffic arriving in the corresponding uplink. Nothing is discarded.

The controller, at step 316, next combines the offered traffic values, the relative size of uplinks compared with downlinks, and the utilization efficiencies of the downlinks to determine the need for downlink bandwidth using the following equations:

$$\text{Need}_{gwdl}=\text{RelSize}*TO_{gwdl}/UE_{gwdl} \quad [7]$$

$$\text{Need}_{udl}=\text{RelSize}*TO_{udl}/UE_{udl} \quad [8]$$

Assuming that RelSize=2, with concentration, in the example of FIG. 4, and $UE_{gwdl}=0.7$ and $UE_{udl}=1.0$, then $\text{Need}_{gwdl}=2*(0.5/0.7)=1.43$.

$\text{Need}_{udl}=2*(5/1.0)=10$.

If ceiling ($\text{Need}_{gwdl}$)+ceiling ($\text{Need}_{udl}$) is less than or equal to $\text{Num}_{down}$, the controller 108 (at step 318) preferably assigns ceiling ($\text{Need}_{gwdl}$) downlinks to the gateways and ceiling ($\text{Need}_{udl}$) downlinks to the users. Any additional downlinks may be held in reserve or assigned in any manner desired.

Conversely, if $\text{Num}_{down}$ is inadequate to meet the total need, the controller 108 preferably finds an assignment that maximizes the overall throughput of the system, even if the assignment falls short of delivering all of the uplinked traffic. In an actual system implementation, the uplinked traffic will be reduced to match the maximal downlink capacity that results from the assignment.

In a system in which downlinks are divisible and in which fractions of uplinks may be downlinked, the optimal assignment is:

$$\text{TentAssign}_{gwdl} = \text{Num}_{down} * \text{Need}_{gwdl} / (\text{Need}_{gwdl} + \text{Need}_{udl}) \quad [9]$$

$$\text{TentAssign}_{udl} = \text{Num}_{down} * \text{Need}_{udl} / (\text{Need}_{gwdl} + \text{Need}_{udl}) \quad [10]$$
$$= \text{Num}_{down} - \text{TentAssign}_{gwdl}.$$

For the example of FIG. 4, assuming $\text{Num}_{down}=10$:

$\text{TentAssign}_{gwdl}=10*1.43/(1.43+10)=1.25$ $\text{TentAssign}_{udl}=10*10/(1.43+10)=8.75$ In some systems, however, the controller 108 assigns each downlink exclusively to the gateways or the users. In further systems, there may be uplinks that are not concentrated and that are therefore downlinked in their entirety (or else are abandoned). The operation of the controller 108 in these systems is explained below.

The controller 108 examines the traffic-carrying capacity of alternative downlink assignments where each assignment is a whole number of downlinks. The controller 108 proceeds by working backward through the preceding equations from the alternative assignment of downlinks to the capacity. The measure of capacity is preferably the CarriedUp value obtained using equation [5].

The controller 108 considers alternative assignments of $DL_{gw}$ downlinks assigned to gateways and $DL_u$ downlinks assigned to user terminals (step 320). The controller 108 then preferably determines the capacity of the downlinks to carry traffic offered to them. Equations [7] and [8] may be modified to produce equivalent traffic offered, ETO equations shown below in equations [11] and [12]. The ETO is the amount of offered traffic that would fill the downlink assignment currently under consideration. (ETO is measured in units equal to the capacity of an uplink.)

$$ETO_{gwdl} = DL_{gw} * UE_{gwdl}/RelSize \quad [11]$$

$$ETO_{udl} = DL_u * UE_{udl}/RelSize \quad [12]$$

Assuming for example, that the controller 108 is evaluating an assignment $DL_{gw}=3$ and $DL_u=7$, then:

$$ETO_{gwdl}=3*0.7/2=1.1.$$

$$ETO_{udl}=7*1.0/2=3.5.$$

If uplinked traffic is not concentrated, then the uplinked traffic is carried down in indivisible quanta of full uplinks. Therefore, without concentration, the controller 108 compensates by truncating values of ETO to whole integers (step 322). Note that one restriction assumed in the non-concentrated traffic case is that the quotient (UE/RelSize) is greater than or equal to 1, otherwise the uplink would not fit into a downlink. Note also that if traffic is concentrated, the restriction does not apply.

It is further noted that either or both of the outbound and inbound paths can be concentrated or not concentrated independently of the other. The present technique applies to each case, however. For example, in a non-concentrated path, the value of ETO will be compensated by truncation, while in the concentrated path it will not be truncated).

Next, the controller 108 preferably converts ETO to equivalent uplinks, EUL at step 324. Equivalent uplinks are the number of uplinks which would offer ETO traffic to the downlinks when the uplink utilization efficiency is taken into account. Again, a distinction is preferably made between concentrating and non-concentrating directions through the satellite. If both directions are concentrated, then the EUL are evaluated using:

$$EUL_{gw}=\text{minimum}(Assign_{gwul}, ETO_{udl}/UE_{gwul}) \quad [13]$$

$$EUL_u=\text{minimum}(Assign_{uul}, ETO_{gwdl}/UE_{uul}) \quad [14]$$

where $Assign_{gwul}$ and $Assign_{uul}$ are the uplink assignments obtained from equations [6A] or [6B]. They are included here since the satellite cannot downlink more traffic than is uplinked to it.

The controller 108, at step 326, determines traffic carried as:

$$TC=minimum(EUL_{gw}*UE_{gwul}, R*EUL_u*UE_{uul}) \quad [15]$$

For the example of FIG. 4:

$$EUL_{gw}=\text{min}(5,3)=3.$$

$$EUL_u=\text{min}(2,1/0.3)=\text{min}(2,3.33)=2.$$

$$TC=\text{min}(3*1,10*2*0.3)=\text{min}(3,6)=3.$$

If neither path is concentrated, then the EUL are evaluated using:

$$EUL_{gw}=\text{minimum}(Assign_{gwul}, ETO_{udl}) \quad [16]$$

$$EUL_u=\text{minimum}(Assign_{uul}, ETO_{gwdl}) \quad [17]$$

and, again, traffic carried, TC, is determined using equation [15].

For the example under consideration:

$$EUL_{gw}=\text{min}(5,3.5)=3.5.$$

$$EUL_u=\text{min}(2,1.1)=1.1.$$

$$TC=min(3.5*1,10*1.1*0.3)=\text{min}(3.5,3.3)=3.3.$$

If one path is concentrated while the other is not, then the EUL are found by choosing from among equations [13], [14], [16], and [17] according to the paths that are concentrated, and applying equation [15] to the result.

The controller 108 preferably repeats this process for all possible downlink assignments. The assignment which obtains the greatest value for TC is selected (step 328). The assignment values are put into $Assign_{gwdl}$ and $Assign_{udl}$ for communication to the gateways and users, in a bandwidth assignment message.

As another example, assume a concentrating satellite which allocates uplinks and downlinks in their entirety to users or gateways. The relevant input quantities are shown in Table 1:

TABLE 1

| Parameter | Value |
|---|---|
| R | 10 |
| $UE_{gwul}$ | 0.8 |
| $UE_{uul}$ | 0.2 |
| $UE_{gwdl}$ | 0.7 |
| $UE_{udl}$ | 1 |
| RelSize | 1 |
| $Num_{up}$ | 10 |
| $Num_{down}$ | 10 |

The values obtained from the equations above are:

$$SUUB=(0.8/0.2)/10=0.4 \quad [1]$$

$$TentAssign_{gwul}=10/(1+0.4)=7.14 \quad [2]$$

$$TentAssign_{uul}=10*0.4/(1+0.4)=2.86 \quad [3]$$

$$AssignA_{gwul}=8, Assign_{uul}=2 \quad [4A]$$

$$Assign_{gwul}=7, Assign_{uul}=3 \quad [4B]$$

CarriedUp applied to [4A] yields 4 [5]

CarriedUp applied to [4B] yields 5.6

Does not apply. [6A]

$$Assign_{gwul}=7, Assign_{uul}=3 \quad [6B]$$

Because the satellite concentrates in both the inbound and outbound directions, the traffic offered is found as:

$TO_{udl}$=CarriedUp=5.6

$TO_{gwdl}$=(1/10) CarriedUp=0.56

$Need_{gwdl}$=1*0.56/0.7=0.8          [7]

$Need_{udl}$=1*5.6/1=5.6          [8]

Since ceiling ($Need_{gwdl}$)+ceiling ($Need_{udl}$)=1+6<=10, the controller 108 sets $Assign_{gwdl}$=1 and $Assign_{udl}$=6.

Since the capacity is not limited by the downlink side, the capacity of the system, TC, is equal to the uplink capacity. Measuring this capacity as the capacity of the gateway uplinks (i.e., using $CarriedUp_{gwul}$), the capacity is 5.6 links worth of traffic.

Using a conventional symmetric assignment, the controller would assign $Assign_{gwul}$, $Assign_{uul}$, $Assign_{gwdl}$, and $Assign_{udl}$ each equal to 5. The system would be constrained by the capacity of the gateway uplinks (5*0.8=4 links worth of traffic). Thus, the asymmetric assignment carries 40% more traffic than the symmetric assignment. Further, if the controller 108 is used during system planning, the system designers will be alerted to the fact that only 7 downlinks are required to support 10 uplinks. By incorporating the asymmetry into the design of the system, critical satellite resources which would have been wasted can instead be used to support other beams and to increase the useful capacity of the satellite.

Figure 5:
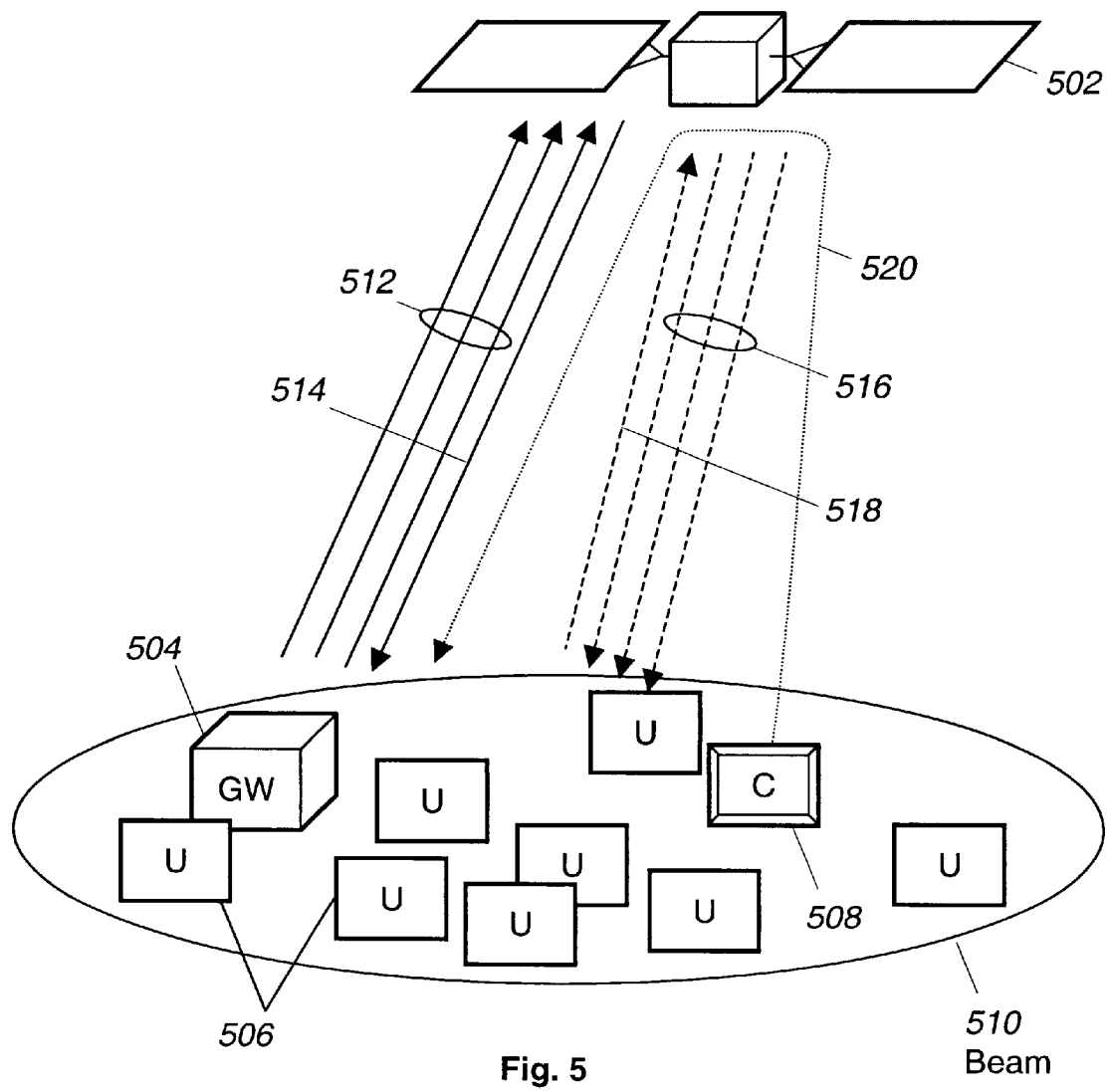
FIG. 5 shows an example of asymmetric bandwidth assignment in a satellite communication system.
Figure 6:
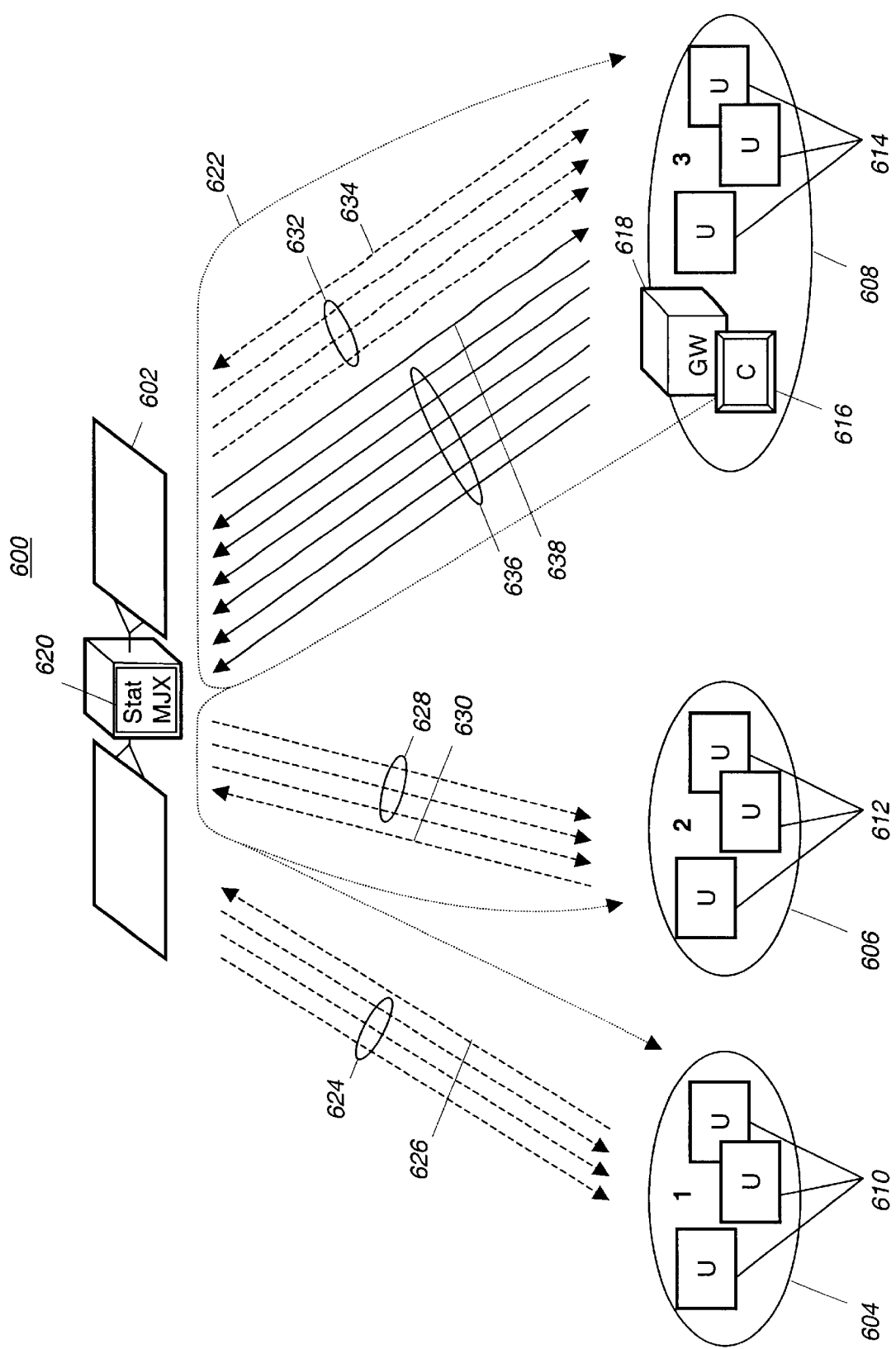
FIG. 6 shows an example of asymmetric bandwidth assignment over three spot beams in a satellite communication system.

With the general aspects of the current technique set forth above, FIGS. 5 and 6 next present additional examples of asymmetric bandwidth assignment. Turning now to FIG. 5, that figure illustrates a communication system 500 including a bent-pipe non-concentrating satellite 502, a gateway 504, and numerous user terminals 506. A controller 508 is also present in the spot beam 510 generated by the satellite 502. FIG. 5 further illustrates three gateway uplinks 512, a gateway downlink 514, three user terminal downlinks 516, a user terminal uplink 518, and a signaling channel 520. The way in which the uplinks 512, 518 and downlinks 514, 516 were assigned is explained below.

For the communication system 500, the following parameters set forth in Table 3 are assumed to apply:

TABLE 3

| Parameter | Value |
| --- | --- |
| R | 10 |
| $UE_{uul}$ | 0.3 |
| $UE_{gwul}$ | 1.0 |
| $UE_{udl}$ | 1.0 |
| $UE_{gwdl}$ | 1.0 |
| RelSize | 1 |
| $Num_{up}$ | 4 |
| $Num_{down}$ | 4 |

Evaluating the equations above yields:

$SUUB$=(1/0.3)/10=0.33          [1]

$TentAssign_{gwul}$=4/(1+0.33)=3.01          [2]

$TentAssign_{uul}$=4*0.33/(1+0.33)=0.99          [3]

$AssignA_{gwul}$=4, $Assign_{uul}$=0          [4A]

$Assign_{gwul}$=3, $Assign_{uul}$=1          [4B]

CarriedUp applied to [4A] yields 0          [5]

CarriedUp applied to [4B] yields 3

Does not apply.          [6A]

$Assign_{gwul}$=3, $Assign_{uul}$=1          [6B]

Because the satellite does not concentrate, the traffic offered is found as:

$TO_{udl}$=3

$TO_{gwdl}$=1

$Need_{gwdl}$=1*1/1=1          [7]

$Need_{udl}$=1*3/1=3          [8]

Since ceiling ($Need_{gwdl}$)+ceiling ($Need_{udl}$)=1+3<=4, the controller 508 sets $Assign_{gwdl}$=1 and $Asisgn_{udl}$=3.

The capacity of the communication system 500, TC, is equal to the uplink capacity, or 3 units of traffic (assuming each uplink carries one unit of traffic). Using a conventional symmetric assignment, however, the controller would assign $Assign_{gwul}$, $Assign_{uul}$, $Assign_{gwdl}$, and $Assign_{udl}$ each equal to 2. The system would by constrained by the capacity of the gateway uplinks (2*1=2 units of traffic). Thus, the asymmetric assignment carries 50% more traffic than the symmetric assignment. Note that the satellite 302 provided the spot beam 310 with equal bandwidth in the uplinks 312, 318 and downlinks 314, 316. Although the total uplink and downlink bandwidth provided was balanced or equal, the controller 308 assigned it asymmetrically.

FIG. 6 illustrates application of the present method for assigning bandwidth in a more complicated communication system 600. FIG. 6 illustrates a satellite 602 providing three spot beams (beam1 604, beam2 606, and beam3 608) of coverage for the communication system 600. Beam1 604 includes the user terminals 610, beam2 606 includes the user terminals 612, and beam3 608 includes the user terminals 614, a controller 616, and a gateway and monitor 618. Note also that the satellite 602 carries a statistical multiplexer 620 (i.e., a concentrator). FIG. 6 also illustrates a signaling channel 622 and numerous uplinks 626, 630, 634, and 636 and downlinks 624, 628, 632, and 638 (to be discussed in more detail below).

Table 4 describes the parameters of the system shown in FIG. 6:

TABLE 4

| Parameter | Value |
| --- | --- |
| R | 10 |
| $UE_{uul}$ | 0.3 |
| $UE_{gwul}$ | 1.0 |
| $UE_{udl}$ | 1.0 |
| $UE_{gwdl}$ | 1.0 |
| RelSize | 1.5 |
| $Num_{up}$ | 9 |
| $Num_{down}$ | 10 |

Evaluation of the equations above yields:

$SUUB$=(1/0.3)/10=0.33          [1]

$TentAssign_{gwul}$=9/(1+0.33)=6.77          [2]

$TentAssign_{uul}$=9*0.33/(1+0.33)=2.23          [3]

$AssignA_{gwul}$=7, $Assign_{uul}$=2          [4A]

$Assign_{gwul}$=6, $Assign_{uul}$=3          [4B]

CarriedUp applied to [4A] yields 6     [5]

CarriedUp applied to [4B] yields 6

Does not apply.     [6A]

[6B] $Assign_{gwul}=6$, $Assign_{uul}=3$, since the communication system 600 needs at least 3 uplinks to support the three different beams 604, 606, 608.

Because the satellite 602 concentrates, the traffic offered is:

$TO_{udl}=6$ $TO_{gwdl}=0.6$ $Need_{gwdl}=1.5*0.6/1=0.9$     [7]

$Need_{udl}=1.5*6/1=9$     [8]

Since ceiling ($Need_{gwdl}$)+ceiling ($Need_{udl}$)=1+9=10<=10, the controller 616 sets $Assign_{gwdl}=1$ and $Asisgn_{udl}=9$. Three user terminal downlinks 624, 628, 632 are allocated for each spot beam 604, 606, 608.

The assignment illustrated in FIG. 6 gives the communication system 600 a traffic capacity of 9 traffic units. Note also that the system designers do not need to include the circuitry for a tenth uplink (to match the 10 downlinks), because ten uplinks are not required for maximum throughput operation. In this example, a conventional assignment of bandwidth would result in 5 user uplinks and downlinks and 5 gateway uplinks and downlinks. It is very likely that each of beam1 604 and beam2 606 would have been assigned two user uplinks and downlinks, and beam3 608 would have been assigned one user uplink and downlink and four gateway uplinks and downlinks. The conventional system capacity would have been 5 traffic units. The bandwidth assignment distributed by the controller 616 increases system capacity by 80% in this example.

In the communication system 600, however, the controller 616 creates an asymmetric provisioning of uplinks and downlinks. Beam1 604 and beam2 606 each are assigned three downlinks 624 (for user terminals 610), 628 (for user terminals 612) and one uplink 626 (for user terminals 610), 630 (for user terminals 612). In beam3 608, three downlinks 632 and one uplink 634 are assigned to user terminals 614, while six uplinks 636 and one downlink 638 are assigned to the gateway 618. The asymmetric assignment greatly increases system capacity.

Figure 7:
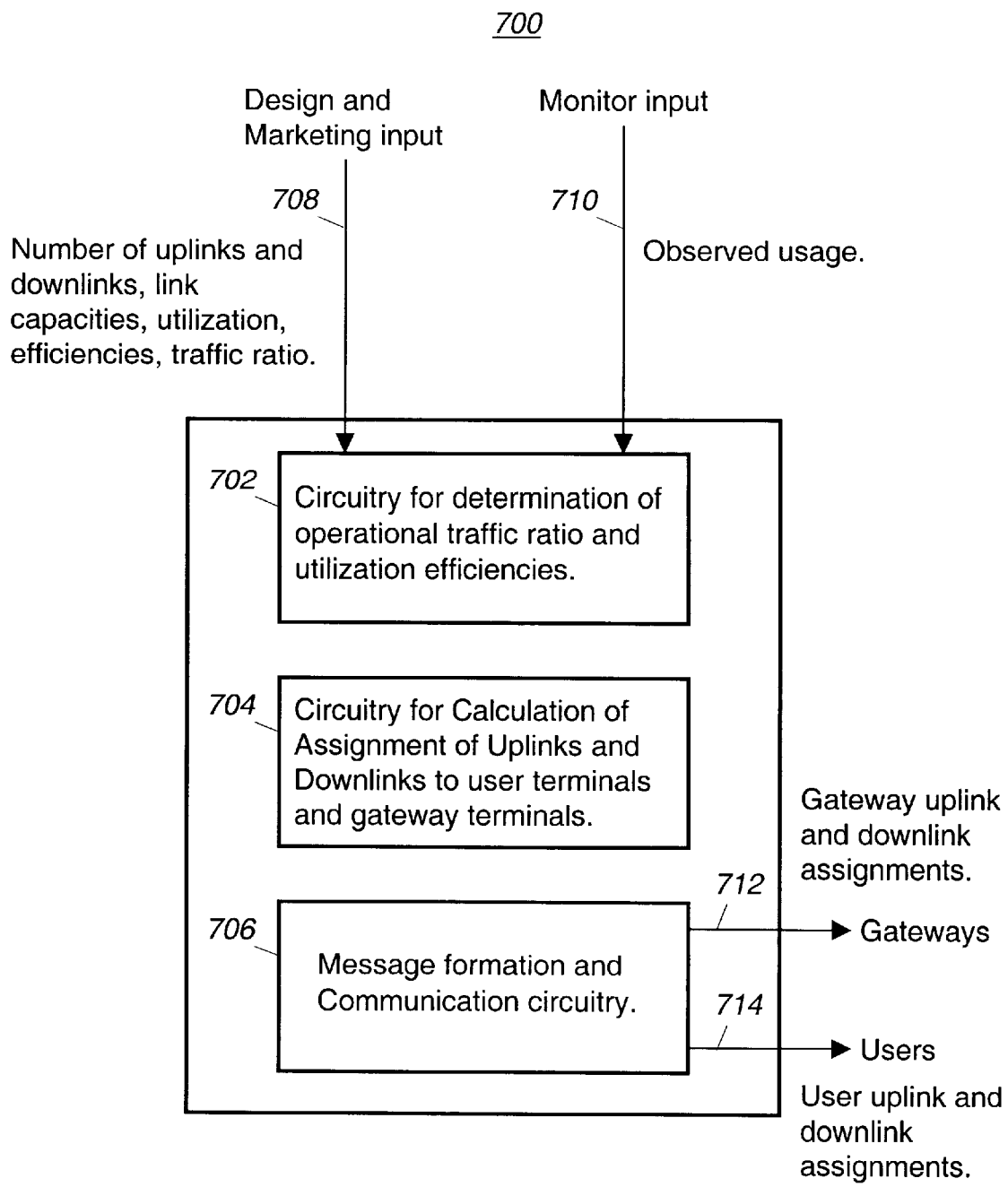
FIG. 7 illustrates a block diagram of a controller that may be used to distribute bandwidth in a communication system.

Turning now to FIG. 7, that figure illustrates a block diagram of a controller 700 that may be used to determine bandwidth distributions as described above. The controller 700 includes input parameter determination circuitry 702, uplink and downlink assignment circuitry (assignment circuitry) 704, and communication circuitry 706. The controller 700 may receive input parameters from engineering or marketing inputs 708, or from a controller input 710. The controller 700 transmits uplink and downlink assignment information to gateway terminals and user terminals using the gateway output 712 and the user terminal output 714 (both of which, for example, may couple to a transmitter that sends information over a single signaling channel).

In operation, the input parameter determination circuitry 702 directly accepts (from a marketing study, for example), or determines (from monitor 110 information) the parameters of interest in designing or operating a communication system. The input parameters, preferably, correspond to those illustrated in Table 1. With the input parameters known, the assignment circuitry 704 determines, as described above, an assignment of uplinks and downlinks to the user terminals and the gateway terminals. After the assignment circuitry 704 determines the appropriate distribution of uplinks and downlinks, the communication circuitry 706 creates an appropriate message (in any supported format) that relays the uplink and downlink assignments to the gateways and user terminals. The communication circuitry 706 may use, for example, a single signaling channel received by the user terminals and the gateways for this purpose. As a general matter, the controller 700 may be implemented using one or more general purpose CPUs, DSPs, or ASICs, or using discrete logic, either as a general programmed computer executing instructions from a memory, or as a hardware only implementation.

Note that the controller 700 may be used as both a planning tool and as an operational tool. As a planning tool, the controller 700 may be used to determine the number of uplinks and downlink to be built into a communication system, determine the assignment of the uplinks and downlinks to gateways and user terminals, and determine (based on expectations of user take-up of service and on the planned locations of the gateways) the number of uplinks and downlinks to be placed in each satellite beam. The planning tool first stores given or predetermined input parameters, and may be used to determine the remaining parameters (e.g., $Num_{down}$) in view of the equations above. As an operational tool, the controller 700 may be used to periodically (e.g., once per day, week, month, or year) allocate and reallocate uplinks and downlinks on a semi-permanent or dynamically changing basis in an existing communication system.

It is further noted that the controller 700 may be on-board the satellite or on the ground. If the controller 700 is on the ground, it may be co-located with other ground elements or located away from the ground elements with a suitable wire or wireless interconnection, whichever is preferable in the system design. As noted above, the controller 700 may also be used to determine, with multiple gateways and satellite beams, the distribution of uplinks and downlinks in the many beams rather than only determining the number of uplinks and downlinks assigned to gateways and users.

Thus, the present invention assigns communication bandwidth based in part on the asymmetry in inbound and outbound communication between terminals through a satellite. The bandwidth assignments are tailored to the actual needs of the terminals in terms of both bandwidth and latency. As a result, the bandwidth assignments significantly increase the communication capacity, revenue, and throughput of the communication system.

While particular elements, embodiments and applications of the present invention have been shown and described, it is understood that the invention is not limited thereto since modifications may be made by those skilled in the art, particularly in light of the foregoing teaching. It is therefore contemplated by the appended claims to cover such modifications and incorporate those features which come within the spirit and scope of the invention.

What is claimed is:

1. A method for allocating bandwidth in a satellite communication system, the method comprising:

determining an uplink assignment of uplinks to user terminals and a gateway, based on a gateway uplink efficiency, a user terminal uplink efficiency, and a traffic ratio between the user terminal and the gateway; and determining a downlink assignment of downlinks to the user terminals and the gateway, based on traffic offered to the user terminals and the gateway according to the uplink assignment.

2. A method according to claim 1, further comprising the step of communicating the uplink assignment and the downlink assignment to the user terminals and the gateway.

3. A method according to claim 2, wherein the step of communicating comprises communicating over a signaling channel supported by a satellite.

4. A method according to claim 1, wherein the step of determining an uplink assignment further comprises determining a non-integer uplink assignment based on subchannels forming an uplink.

5. A method according to claim 1, wherein the step of determining a downlink assignment further comprises determining a non-integer downlink assignment based on subchannels forming a downlink.

6. A method according to claim 5, wherein the step of determining an uplink assignment comprises determining:

$Assign_{gwul} = Num_{up}/(1+SUUB)$, $SUUB = (UE_{gwul}/UE_{uul})/R$, and $Assign_{uul} = Num_{up} - TentAssign_{gwul}$ where $Assign_{gwul}$ is an assignment of uplinks to the gateways, $Num_{up}$ is a total number of communication system uplinks, SUUB is a specific user bandwidth, $TentAssign_{uul}$=is an assignment of uplinks to the user terminals, R is an outbound to inbound traffic ratio, $UE_{gwul}$ is a utilization efficiency of a gateway uplink, and $UE_{uul}$ is a utilization efficiency of a user terminal uplink.

7. A method according to claim 1, wherein the step of determining an uplink assignment further comprises determining an integer uplink assignment by evaluating integer assignments of uplinks around a non-integer assignment of uplinks yielding maximum outbound capacity.

8. A method according to claim 7, wherein the step of determining an uplink assignment selects the maximum of:

CarriedUp $(AssignA_{gwul}, AssignA_{uul}) = $ minimum $(AssignA_{gwul} * UE_{gwul}, R*AssignA_{uul} *UE_{uul})$ and CarriedUp $(AssignB_{gwul}, AssignB_{uul}) = $ minimum $(AssignB_{gwul} *UE_{gwul}, R*AssignB_{uul} *UE_{uul})$, in accordance with:

$TentAssign_{gwul} = Num_{up}/(1+SUUB)$,
$SUUB = (UE_{gwul}/UE_{uul})/R$,
$TentAssign_{uul} = Num_{up} - TentAssign_{gwul}$,
$AssignA_{gwul} = $ ceiling $(TentAssign_{gwul})$,
$AssignA_{uul} = $ floor $(TentAssign_{uul})$,
$AssignB_{gwul} = $ floor $(TentAssign_{gwul})$,
$AssignB_{uul} = $ ceiling $(TentAssign_{uul})$, where $TentAssign_{gwul}$ is a tentative assignment of uplinks to the gateway, $Num_{up}$ is a total number of communication system uplinks, SUUB is a specific user bandwidth, $TentAssign_{uul}$=is a tentative assignment of uplinks to the user terminals, R is an outbound to inbound traffic ratio, $UE_{gwul}$ is a utilization efficiency of a gateway uplink, and $UE_{uul}$ is a utilization efficiency of a user terminal uplink.

9. A method according to claim 1, wherein the step of determining a downlink assignment further comprises determining a downlink assignment based further on a relative capacity of uplinks compared to downlinks.

10. A method according to claim 9, wherein the step of determining a downlink assignment comprises determining:

$Need_{gwdl} = RelSize*TO_{gwdl}/UE_{gwdl}$, and $Need_{udl} = RelSize*TO_{udl}/UE_{udl}$, where $Need_{gwdl}$ is a number of downlinks desired for each gateway and $Need_{udl}$ a number of downlinks desired for the user terminals, RelSize is a relative size of uplinks compared with downlinks, $TO_{gwdl}$ is traffic offered to the gateway downlinks, $TO_{udl}$ is traffic offered to the user terminal downlinks, $UE_{gwdl}$ is a utilization efficiency of a gateway downlink, and $UE_{udl}$ is a utilization efficiency of a user terminal downlink.

11. A method according to claim 1, further comprising the step of determining when the downlink assignment requires assigning more than a total number of available downlinks, and in response, evaluating assignments of downlinks to the user terminals and the gateways to find a capacity maximizing downlink assignment given the total number of available downlinks.

12. A method according to claim 11, wherein the step of evaluating assignments comprises selecting a new assignment of downlinks for evaluation, determining amounts of traffic offered to the gateway and the user terminals that fill the new assignment of downlinks, determining numbers of uplinks that provide the traffic offered, and determining traffic carried for the new assignment.

13. A method according to claim 12, further comprising the step of evaluating the numbers of uplinks that provide the traffic offered to account for concentration by a satellite.

14. A method according to claim 12, further comprising the step of compensating the amounts of traffic offered that fill the new assignment of downlinks to account for concentration by a satellite.

15. A method according to claim 12, wherein the step of determining traffic carried comprises evaluating:

$TC = $ minimum$(EUL_{gw}*UE_{gwul}, R*EUL_u*UE_{uul})$, where TC is traffic carried, R is an outbound to inbound traffic ratio, $EUL_{gw}$ is a number of gateway uplinks that provide the traffic offered to the gateway, $EUL_u$ is a number of user terminal uplinks that provide the traffic offered traffic offered to the user terminals, $UE_{gwdl}$ is a utilization efficiency of a gateway downlink, and $UE_{udl}$ is a utilization efficiency of a user terminal downlink.

16. A satellite communication system bandwidth controller comprising:

assignment circuitry operable to determine at least one of an uplink assignment of uplinks to user terminals and a gateway, based on a gateway uplink efficiency, a user terminal uplink efficiency, and a traffic ratio between the user terminal and the gateway and a downlink assignment of downlinks to the user terminals and the gateway, based on traffic offered to the user terminals and the gateway according to the uplink assignment; and communication circuitry for communicating the uplink assignment and the downlink assignment to the user terminals and the gateway.

17. A satellite communication system bandwidth controller according to claim 16, further comprising input parameter determination circuitry for determining the gateway uplink efficiency, the user terminal uplink efficiency, and the traffic ratio.

18. A satellite communication system bandwidth controller according to claim 16, wherein the assignment circuitry and the communication circuitry are disposed onboard a satellite.

19. A satellite communication system bandwidth controller according to claim 16, wherein the assignment circuitry and the communication circuitry operate to evaluate a communication system in operation and to respond dynamically to adjust the uplink and downlink assignments.

20. A satellite communication system bandwidth controller according to claim 16, wherein the assignment circuitry operates to evaluate uplink and downlink assignments for a planned communication system.

21. A satellite communication system bandwidth controller according to claim 16, wherein the assignment circuitry is operable to determine a non-integer uplink assignment based on subchannels forming an uplink.

22. A satellite communication system bandwidth controller according to claim 16, wherein the assignment circuitry is operable to determine a non-integer downlink assignment based on subchannels forming a downlink.

23. A satellite communication system bandwidth controller according to claim 16, wherein the assignment circuitry is operable to determine an integer uplink assignment by evaluating integer assignments of uplinks around a non-integer assignment of uplinks yielding maximum outbound capacity.

24. A satellite communication system bandwidth controller according to claim 16, wherein the assignment circuitry is operable to determine when the downlink assignment requires assigning more than a total number of available downlinks, and in response, to evaluate assignments of downlinks to the user terminals and the gateway to find an optimized downlink assignment given the total number of available downlinks.

25. A satellite communication system bandwidth controller according to claim 24, wherein the assignment circuitry is further operable to select a new assignment of downlinks for evaluation, determine amounts of traffic offered to the gateway and the user terminals that fill the new assignment of downlinks, determine numbers of uplinks that provide the traffic offered, and determine traffic carried for the new assignment.

26. A satellite communication system bandwidth controller according to claim 16, wherein the assignment circuitry is further operable to compensate the numbers of uplinks that provide the traffic offered to account for concentration by a satellite.

27. A satellite communication system bandwidth controller according to claim 16, wherein the assignment circuitry is further operable to compensate for the amounts of traffic offered that fill the new assignment of downlinks to account for concentration by a satellite.

28. A satellite communication system comprising:
   user terminals;
   a gateway;
   a satellite providing uplinks and downlinks for the user terminals and the gateway; and
   a bandwidth controller comprising uplink and downlink assignment circuitry operable to determine an uplink assignment of the uplinks to user terminals and a gateway, based on a gateway uplink efficiency, a user terminal uplink efficiency, and a traffic ratio between the user terminals and the gateway and that is operable to determine a downlink assignment of the downlinks to the user terminals and the gateway, based on traffic offered to the user terminals and the gateway according to the uplink assignment.

29. A satellite communication system according to claim 28, wherein the bandwidth controller further comprises communication circuitry for communicating the uplink assignment and the downlink assignment to the user terminals and the gateway.

30. A satellite communication system according to claim 28, further comprising input parameter determination circuitry for determining the gateway uplink efficiency, user terminal uplink efficiency, and the traffic ratio by at least one of evaluating monitor input and receiving the gateway uplink efficiency, user terminal uplink efficiency, and the traffic ratio as design inputs.

31. A satellite communication system according to claim 28, wherein the bandwidth controller is disposed onboard the satellite.

32. A satellite communication system according to claim 28, wherein the bandwidth controller evaluates the satellite communication system periodically during operation and responds dynamically to adjust the uplink and downlink assignments.

33. A satellite communication system according to claim 28, wherein the uplinks are divisible into subchannels, and wherein the bandwidth controller determines non-integer uplink assignments based on the subchannels.

34. A satellite communication system according to claim 28, wherein the downlinks are divisible into subchannels and wherein the bandwidth controller determines non-integer downlink assignments based on the subchannels.

35. A satellite communication system according to claim 28, wherein the bandwidth controller determines integer uplink assignments by evaluating integer assignments of uplinks around a non-integer assignment of uplinks yielding maximum outbound capacity.

36. A satellite communication system according to claim 28, wherein the bandwidth controller determines when the downlink assignment requires assigning more than a total number of available downlinks, and in response, evaluates assignments of downlinks to the user terminals and the gateways to find an optimized downlink assignment given the total number of available downlinks.

37. A satellite communication system according to claim 28, wherein the satellite further comprises a concentrator, and wherein the bandwidth controller determines the downlink assignment in accordance with at least one of a user terminal downlink efficiency and a gateway downlink efficiency imposed by the concentrator.

* * * * *